United States Patent
Matsuda et al.

(10) Patent No.: US 12,458,324 B2
(45) Date of Patent: Nov. 4, 2025

(54) ULTRASONIC DIAGNOSTIC APPARATUS

(71) Applicant: FUJIFILM Healthcare Corporation, Kashiwa (JP)

(72) Inventors: Fumie Matsuda, Chiba (JP); Yukihiro Mita, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 89 days.

(21) Appl. No.: 18/238,087

(22) Filed: Aug. 25, 2023

(65) Prior Publication Data

US 2024/0081780 A1   Mar. 14, 2024

(30) Foreign Application Priority Data

Sep. 13, 2022   (JP) ................... 2022-145624

(51) Int. Cl.
*A61B 8/00*   (2006.01)
*G16H 10/60*  (2018.01)

(52) U.S. Cl.
CPC ............ *A61B 8/465* (2013.01); *G16H 10/60* (2018.01)

(58) Field of Classification Search
CPC ........... A61B 8/465; A61B 8/463; A61B 8/56; A61B 8/54; A61B 8/461; A61B 8/44; A61B 8/5292; G16H 10/60; G16H 40/63; G06F 16/903; G06Q 10/02
See application file for complete search history.

(56) References Cited

U.S. PATENT DOCUMENTS

| | | | | |
|---|---|---|---|---|
| 5,614,660 A | * | 3/1997 | Tanaka | A61B 8/4281 604/165.01 |
| 5,766,151 A | * | 6/1998 | Valley | A61M 39/0247 604/103.07 |
| 5,879,499 A | * | 3/1999 | Corvi | A61M 25/0012 604/524 |
| 6,142,945 A | * | 11/2000 | Sakamoto | A61B 8/445 600/459 |
| 6,440,073 B1 | * | 8/2002 | Robinson | A61B 8/00 600/437 |
| 6,450,958 B1 | * | 9/2002 | Linkhart | G01S 7/52017 600/437 |

(Continued)

FOREIGN PATENT DOCUMENTS

JP   2006-167048 A   6/2006

*Primary Examiner* — Sanjay Cattungal
(74) *Attorney, Agent, or Firm* — Paul Teng

(57) ABSTRACT

A control unit executes examination history acquiring processing to acquire, from a database, one or more examination history information items for an examination that has been performed within a time range between a current time and a time traced back from the current time by a predetermined length of time, and inquiring processing to ask a user whether or not to resume the examination for each of the one or more examination history information items. The inquiring processing includes processing for displaying information that guides user operation. When the user performs operation to resume the examination in response to the inquiring processing, the control unit generates integral examination history information including an examination that has been performed prior to resumption and the resumed examination, as a series of examinations, and registers the integral examination history information in the database.

8 Claims, 4 Drawing Sheets

(56) References Cited

U.S. PATENT DOCUMENTS

| | | | |
|---|---|---|---|
| 6,527,719 B1* | 3/2003 | Olsson | A61B 8/56 600/443 |
| 6,527,721 B1* | 3/2003 | Wittrock | A61B 8/56 600/446 |
| 11,583,245 B2* | 2/2023 | Hadani | A61B 8/445 |
| 2003/0045768 A1* | 3/2003 | Hirooka | A61B 8/4245 600/2 |
| 2006/0195016 A1* | 8/2006 | Fujikura | A61B 1/00082 600/116 |
| 2007/0249940 A1* | 10/2007 | Kohno | A61B 1/00098 600/463 |
| 2008/0058591 A1* | 3/2008 | Saadat | A61B 17/0057 600/109 |
| 2009/0099414 A1* | 4/2009 | Goto | A61B 10/06 600/114 |
| 2010/0331883 A1* | 12/2010 | Schmitz | A61B 17/320758 606/279 |
| 2014/0018788 A1* | 1/2014 | Engelman | A61B 18/1492 606/33 |
| 2016/0016016 A1* | 1/2016 | Taylor | A61B 17/320068 606/169 |
| 2019/0133558 A1* | 5/2019 | Morimoto | A61B 8/12 |
| 2019/0133559 A1* | 5/2019 | Okada | H10N 30/875 |

* cited by examiner

| SUBJECT ID | EXAMINA-TION ID | EXAMINA-TION TARGET | EXAMINATION DATE | ULTRASONIC PROBE | PRESET |
|---|---|---|---|---|---|
| 8888 | FUJI0033 | Abdomen | 2021/04/20 10:30 | CCVV55 | 10. Abdomen |
| 8888 | FUJI0022 | Breast | 2021/04/20 10:00 | LLNN99 | 3. Breast |

FIG. 4

ULTRASONIC DIAGNOSTIC APPARATUS

CROSS REFERENCE TO RELATED APPLICATION

This application claims priority to Japanese Patent Application No. 2022-145624 filed on Sep. 13, 2022, which is incorporated herein by reference in its entirety including the specification, claims, drawings, and abstract.

TECHNICAL FIELD

The present disclosure relates to an ultrasonic diagnostic apparatus, and more particularly to a technique for managing information on examinations to be performed with respect to subjects.

BACKGROUND

Ultrasonic diagnosis systems including a management server and an ultrasonic diagnostic apparatus have been studied and developed. The management server stores therein a work list including subject identifications (IDs) that identify subjects and corresponding examination IDs that identify examinations to be performed for corresponding subjects. The ultrasonic diagnostic apparatus acquires a subject ID and a corresponding examination ID from the work list in the management server, and performs an examination identified with the examination ID with respect to a subject identified with the subject ID.

After completion of the examination for the subject, the ultrasonic diagnostic apparatus transmits, to the management server, a completion notification indicating completion of the examination regarding the subject ID. The management server, receiving the completion notification, deletes the subject ID and the corresponding examination ID from the work list.

JP 2006-167048 A discloses an ultrasonic diagnostic apparatus relevant to the present disclosure, which is an ultrasonic diagnostic apparatus configured to temporarily save or store examination data regarding a first patient in an examination data temporary storage unit during an examination of the first patient and perform an examination for a second patient. The ultrasonic diagnostic apparatus can then resume the examination for the first patient using the examination data that has been temporarily saved.

SUMMARY

Examinations with an ultrasonic diagnostic apparatus may be performed as follows: with an examination for a first subject being suspended, an examination for a second subject is performed, and thereafter the examination of the first subject is resumed for further examination. In a conventional ultrasonic system, after transmission of an examination completion notification from the ultrasonic diagnostic apparatus to the management server at the time of suspension or completion of an examination, an examination ID corresponding to the examination is deleted from the server. This configuration therefore does not allow the ultrasonic diagnostic apparatus to retrieve and display the examination ID and the corresponding subject ID at the time of resumption of an examination by referring to the management server, and is thus unable to smoothly resume operation of a same examination with respect to the subject.

An embodiment of the disclosure is therefore aimed toward simplifying the operation to resume a suspended examination performed with an ultrasonic diagnostic apparatus.

In accordance with an aspect of the disclosure, an ultrasonic diagnostic apparatus includes a controller. The controller is configured to execute examination history acquiring processing to acquire, from a database, one or more examination history information items for an examination that has been performed within a predetermined time range between a current time and a time that is traced back from the current time, and inquiring processing to ask a user whether or not to resume the examination for each of the one or more examination history information items.

In one embodiment, when the user performs an operation to resume examination in response to the inquiring processing, the control unit is configured to generate integral examination history information including an examination that has been performed prior to resumption and the resumed examination as a series of examinations, and to register the integral examination history information in the database.

In one embodiment, in response to a user operation to resume the examination, the control unit is configured to execute a preset for the examination to be performed.

In one embodiment, the inquiring processing includes processing for displaying information that guides user operation.

The disclosure enables simplification of operation to resume a suspended examination performed with an ultrasonic diagnostic apparatus.

BRIEF DESCRIPTION OF DRAWINGS

Embodiments of the present disclosure will be described based on the following figures, wherein:

FIG. 4 illustrates examination history information examples.

DESCRIPTION OF EMBODIMENTS

Figure 1:
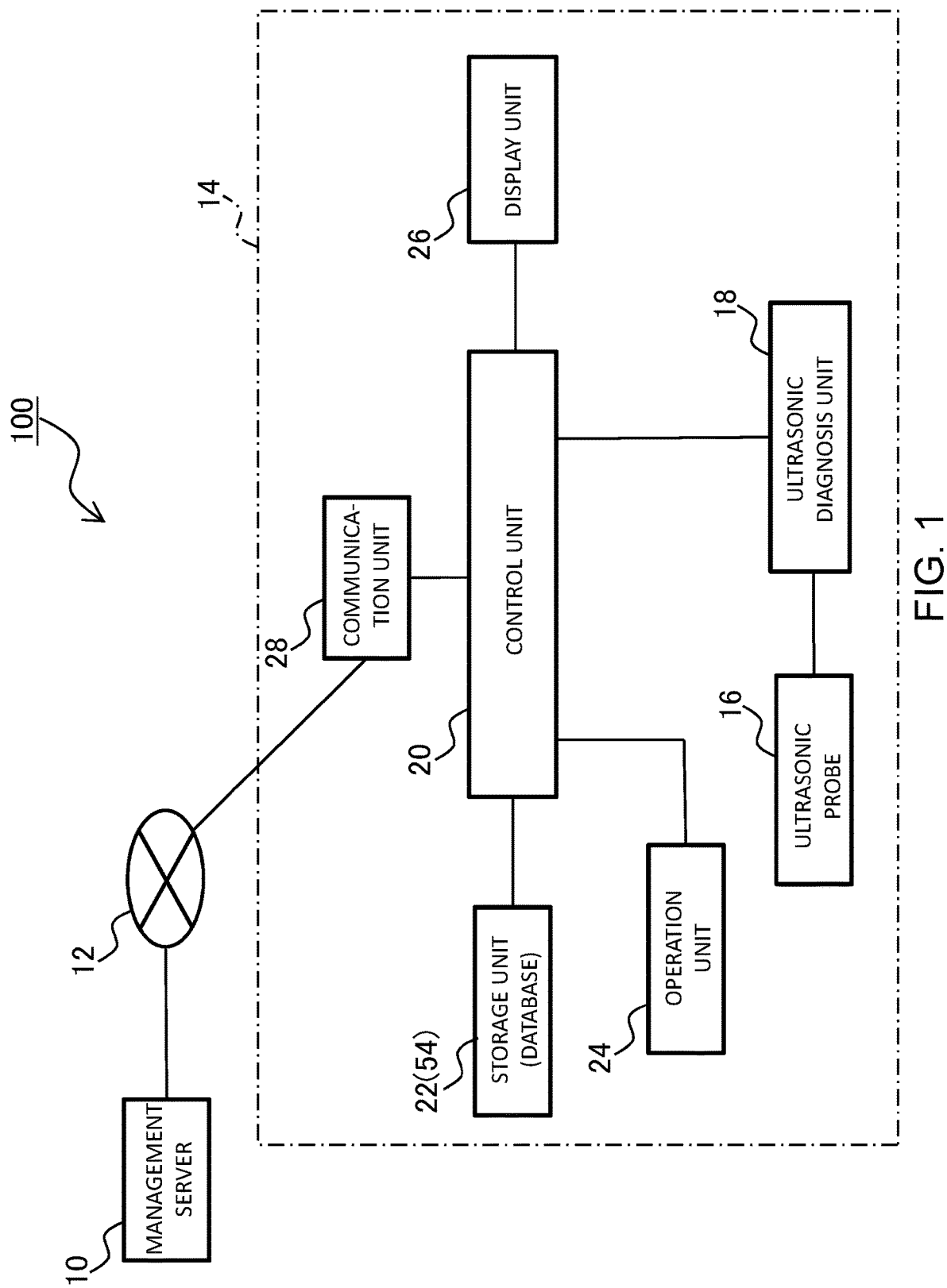
FIG. 1 illustrates a configuration of an ultrasonic diagnosis system according to an embodiment of the disclosure.

FIG. 1 illustrates a configuration of an ultrasonic diagnosis system 100 according to an embodiment of the disclosure. The ultrasonic diagnosis system 100 includes a management server 10, a communication line 12, and an ultrasonic diagnostic apparatus 14. The ultrasonic diagnostic apparatus 14 is communicatively connected, via the communication line 12, to the management server 10 that may be a general-use computer such as a workstation or a personal computer. The communication line 12 may be a Local Area Network (LAN) constructed within a building such as a hospital and a research laboratory, and may be connected with an external lines of communication or the communication network such as the Internet, for example.

The ultrasonic diagnostic apparatus 14 includes an ultrasonic probe 16, an ultrasonic diagnosis unit 18, a control unit 20, a storage unit 22, an operation unit 24, a display unit 26, and a communication unit 28. The operation unit 24 may include a button, a lever, a keyboard, or a mouse, for example. The operation unit 24 may be a touch panel disposed on the display unit 26. The control unit 20 may comprise a processor that executes a program stored in the storage unit 22 or a grogram prestored in the processor. The control unit 20 may control each unit of the ultrasonic diagnostic apparatus 14 in response to user operation of the operation unit 24.

The ultrasonic diagnosis unit 18 causes the ultrasonic probe 16 to transmit ultrasonic waves. The ultrasonic probe 16 transmits ultrasonic waves toward a living body tissue of a subject. The ultrasonic probe 16 then receives ultrasonic waves reflected from the living body tissue, transforms the received ultrasonic waves into an electrical signal or a received signal, and outputs the received signal to the ultrasonic diagnosis unit 18. The ultrasonic diagnosis unit 18 generates image data based on the received signal, and outputs the image data to the control unit 20. The control unit 20 outputs a video signal based on the image data to the display unit 26 that may be a liquid crystal display or an organic EL display, for example. The display unit 26 displays an image based on the image data.

The communication unit 28 is communicatively connected, via the communication line 12, with the management server 10. The control unit 20 is communicatively connected, via the communication unit 28 and the communication line 12, with the management server 10 to acquire information from the management server 10 or transmit information to the management server 10. Along with or in place of the storage unit 22, a memory of a computer connected with the communication line 12 may be used. Further, along with or in place of the storage unit 22, a memory of a computer connected with an external communication line connected with the communication line 12 may be used.

Figure 2:
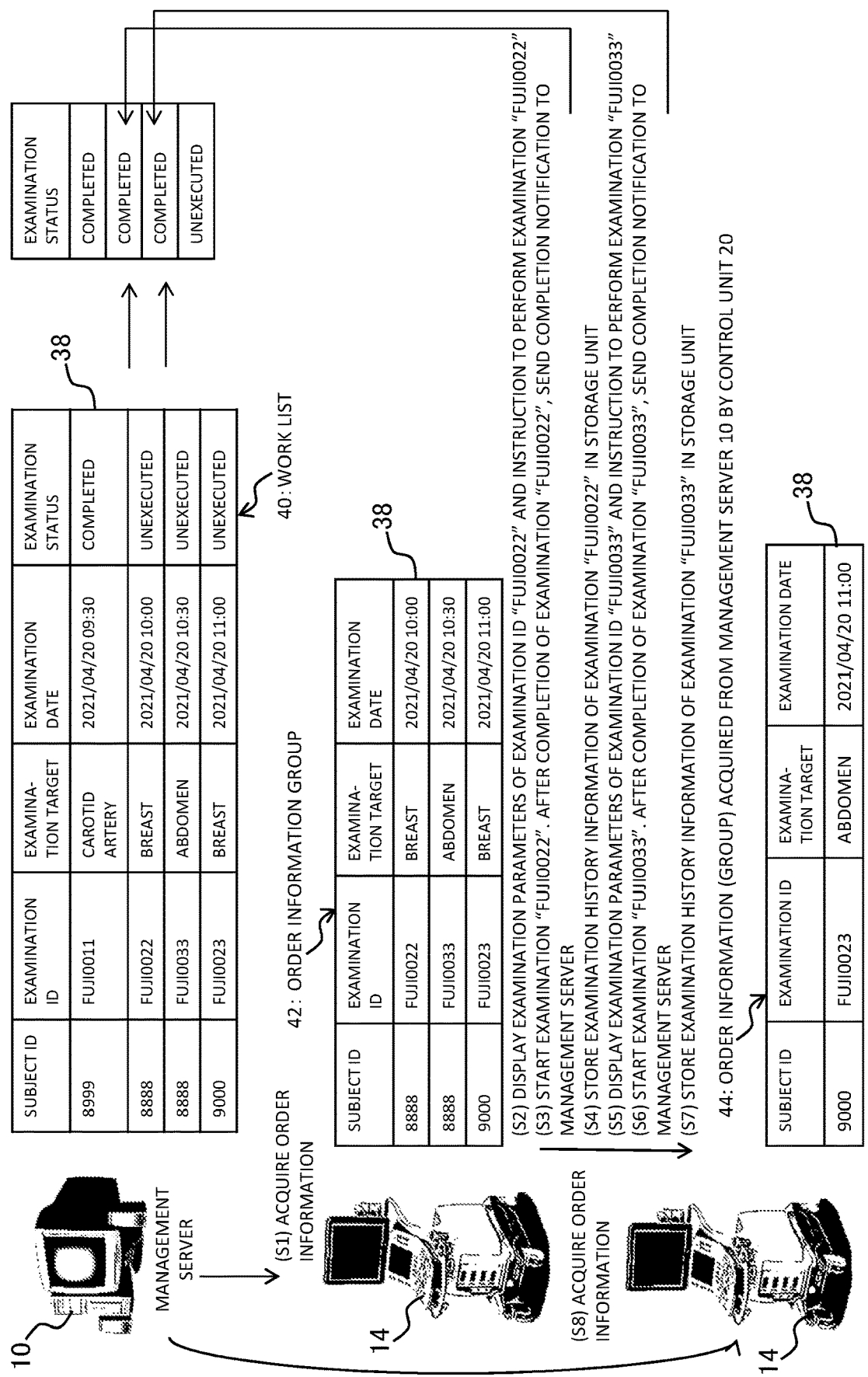
FIG. 2 illustrates basic processing to be performed by an ultrasonic diagnostic apparatus to acquire order information from a management server and operate in accordance with the order information.

Referring to FIG. 2, basic processing to be performed by the ultrasonic diagnostic apparatus 14 to acquire order information indicating the examination parameters from the management server 10 and operate in accordance with the order information will be described. FIG. 2 conceptually shows, at the top, a work list 40 including a list of order information items 38 stored in the management server 10. The order information item 38 comprises information on a subject ID, an examination ID, an examination target, examination day and time, and an examination status, which are correlated with each other. The subject ID identifies a subject. The examination ID identifies an examination to be performed on a subject. The examination target indicates a target to be examined. The examination day and time indicates date and time of an examination scheduled for a subject. The examination status indicates whether or not an examination is completed.

The control unit 20 acquires the order information 38 of an examination that has not been completed at the current time, or an unexecuted examination, from the management server 10 (S1). FIG. 2 shows, in the middle portion, an order information group 42 regarding the unexecuted examinations. The control unit 20 retrieves a subject ID input into the operation unit 24. The control unit 20 acquires an examination ID corresponding to the subject ID retrieved from the operation unit 24, based on the order information 38, and causes the display unit 26 to display the content of the examination identified with the examination ID and an instruction content to perform the examination (S2, S5). The user operates the operation unit 24 in accordance with the examination displayed on the display unit 26, and the control unit 20 causes the ultrasonic diagnosis unit 18 to operate in accordance with the user operation. After completion of each examination, the control unit 20 transmits a completion notification regarding each examination to the management server 10 (S3, S6). The control unit 20 stores examination history information on each examination in the storage unit 22 to register the examination history information in a database 54 in the storage unit 22 (S4, S7).

FIG. 2 shows, in the middle portion, example processing (S2 to S7) for a specific input subject ID "8888". In step S2, the content of the examination identified with an examination ID "FUJI0022" corresponding to the subject ID "8888" and an instruction to perform the examination identified with the examination ID "FUJI0022" are displayed on the display unit 26. In step S3, the examination identified with the examination ID "FUJI0022" is started. After completion of the examination, a completion notification is transmitted to the management server 10. In step S4, examination history information regarding the examination identified with the examination ID "FUJI0022" is stored in the storage unit 22, and the examination history information is registered in the database 54 of the storage unit 22.

The examination history information may be information including, for example, the subject ID, the examination ID, the examination target, the examination date and time, and the subject name, which are correlated with each other, for a completed examination.

In step S5, the content of an examination identified with an examination ID "FUJI0033" corresponding to the subject ID "8888" and an instruction to perform the examination identified with the examination ID "FUJI0033" are displayed on the display unit 26. In step S6, the examination identified with the examination ID "FUJI0033" is started. After completion of the examination, a completion notification is transmitted to the management server 10. In step S7, examination history information regarding the examination identified with the examination ID "FUJI0033" is stored in the storage unit 22, and the examination history information is registered in the database 54 in the storage unit 22 (S7).

The examination status of the examination identified with the examination ID "FUJI0022" has been changed from "unexecuted" to "completed" through step S3, and the examination status of the examination identified with the examination ID "FUJI0033" has been changed from "unexecuted" to "completed" through step S6.

FIG. 2 shows, at the bottom, the order information (group) 44 acquired from the management server 10 by the control unit 20 after completion of step S7. In the present embodiment, the order information 38 regarding an examination ID with its examination status being already "completed" is deleted or is not obtainable from the work list 40 in the management server 10. This does not allow storing, in the storage unit 22, of examination history information of a further examination, as the examination history information of the same examination previously performed for the same subject, after resumption of the previously-performed examination.

In the example shown at the bottom of FIG. 2, for example, the order information 38 regarding the subject ID "8888" is not acquired, because the examination status of the order information 38 regarding the subject ID "8888" is "completed". Therefore, performing a further examination regarding the subject identified with the subject ID "8888" according to processing similar to the conventional processing would raise the following difficulty. Assuming that an examination is performed in the morning and is then resumed for a further examination in the afternoon, it is difficult to store, in the storage unit 22, the examination history information of the examination that is resumed in the afternoon as the examination history information of the same examination performed in the morning.

To address the above difficulty, the ultrasonic diagnostic apparatus 14 according to the present embodiment executes the following processing in accordance with the user operation, to enable the user to resume the examination that has been performed in the past. Specifically, the ultrasonic diagnostic apparatus 14 acquires, from the database 54 of the storage unit 22, examination history information regarding an examination that has been performed for a specific subject within a time range between a current time and a time that is traced back from the current time by a predetermined length of time. The ultrasonic diagnostic apparatus 14 then executes processing to ask the user whether to perform a further examination, based on the examination history information acquired from the database 54. The user operation to resume the examination in response to the inquiry causes the ultrasonic diagnostic apparatus 14 to execute processing to resume the examination.

To start diagnosis with the ultrasonic diagnostic apparatus 14, the user operates the operation unit 24 to input a subject ID as information for identifying a subject. The control unit 20 retrieves the subject ID (hereinafter referred to as an "input subject ID") from the operation unit 24 and acquires, from the database 54 of the storage unit 22, examination history information of an examination that has been performed for the input subject ID within a time range between a current time and a time that is traced back from the current time by a predetermined length of time that may be 24 hours, for example.

Figure 3:
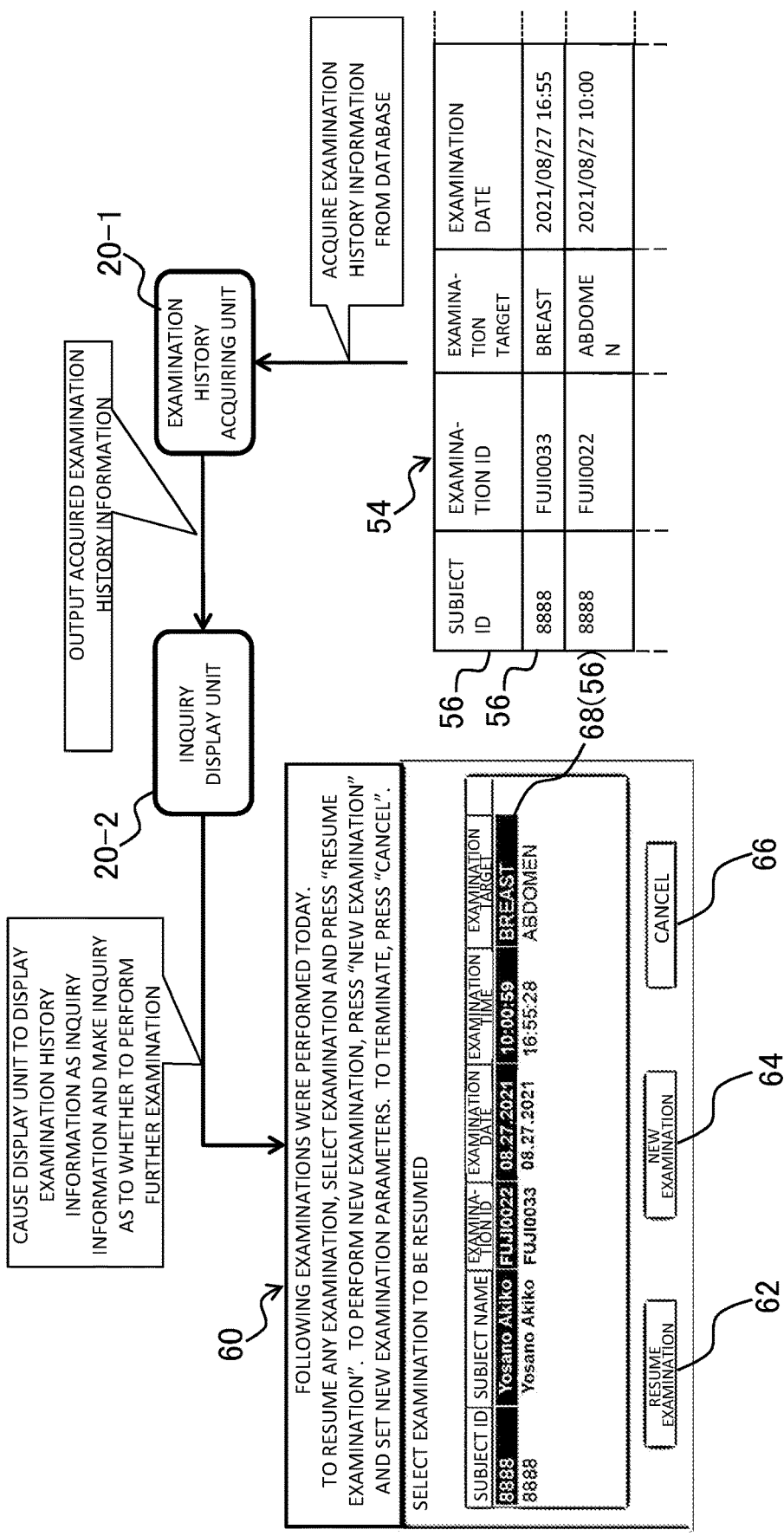
FIG. 3 illustrates processing to be performed with regard to an examination corresponding to an input subject ID that has been performed within a time range between a current time and a time that is traced back from the current time by a predetermined length of time.

FIG. 3 illustrates processing to be executed when an examination corresponding to an input subject ID has been performed within a time range between the current time and a time traced back from the current time by a predetermined length of time. The control unit includes an examination history acquiring unit 20-1 and an inquiry display unit 20-2. The examination history acquiring unit 20-1, referring to the database 54 of the storage unit 22, acquires examination history information 56 for the examination that has been performed within a time range between the current time and a time traced back from the current time by a predetermined length time, and outputs the acquired examination history information 56 to the inquiry display unit 20-2.

The inquiry display unit 20-2 causes the display unit 26 to display the examination history information 56 as the inquiry information, and makes inquiry as to whether or not to resume the examination. FIG. 3 shows an example inquiry window 60 displayed on the display unit 26. The inquiry window 60 shows, as the inquiry information 68, the examination history information 56. The inquiry information 68 displayed on the inquiry window 60 includes a subject ID, a subject name, an examination ID, an examination date, an examination time, and an examination target, which are correlated with each other.

The inquiry window 60 illustrated in FIG. 3 includes two inquiry information items regarding the subject ID "8888"; a first inquiry information item having the subject name "Yosano Akiko", the examination ID "FUJI0022", the examination date "08. 27. 2021", the examination time "10:00:59", and the examination target "BREAST", and a second inquiry information item having the subject name "Yosano Akiko", the examination ID "FUJI0033", the examination date "08. 27. 2021", the examination time "16:55:28", and the examination target "ABDOMEN".

The inquiry window 60 includes an resume examination button 62 labeled "Resume Examination", a new examination start button 64 labeled "New Examination", and a cancel button 66 labeled "Cancel". The inquiry window 60 shows, in the upper region, a guidance "The following examinations were performed today. To resume any examination, select the examination and press 'Resume Examination'. To perform a new examination, press 'New Examination' and set new examination parameters. To terminate, press 'Cancer'". This guidance may be displayed on the display unit 26 in a window other than the inquiry window 60.

As described above, the examination history acquiring unit 20-1 of the control unit 20 executes examination history acquiring processing to acquire, from the database 54, one or more examination history information items 56 regarding examinations that have been performed within a predetermined time range between the current time and the time that is traced back from the current time. The inquiry display unit 20-2 of the control unit then executes inquiring processing to query the user whether to resume the examination regarding each of the one or more examination history information items 56. During the inquiring processing, the control unit 20 displays on the display unit 26 information to guide user operation. In other words, the inquiring processing includes processing to display information that guides the user operation, thereby encouraging or facilitating the user resumption of the examination.

In response to user selection of one of the inquiry information items 68 displayed in the inquiry window 60 and selection of the resume examination button 62 through operation of the operation unit 24, the control unit 20 sets the status of the ultrasonic diagnostic apparatus 14 to resume the examination identified with the examination ID in the inquiry information 68.

Resumption of examination corresponding to the selected inquiry information 68 may enable further examination to be performed regarding the resumed examination. In response to the user operation at the time of completion of the examination corresponding to the inquiry information 68, the control unit 20 updates the examination date and time of the examination history information 56 regarding the inquiry information 68, and stores the updated examination history information 56 in the storage unit 22, thereby updating the examination history information registered in the database 54. The control unit 20 may include, in the updated examination history information 56, information indicative of the examination time and the information indicative of the examination parameters for each of a plurality of examinations performed within the traced-back time range.

As described above, when the user performs operation to resume an examination, the control unit 20 generates integral examination history information including the examination that has been performed prior to resumption and the resumed examination combined into a series of examinations and registers the integral examination history information in the database 54.

In response to the user selection of the new examination start button 64, the control unit 20 sets the status of the ultrasonic diagnostic apparatus 14 to start a new examination that does not comply with the inquiry information 68. In response to the user selection of the cancel button 66, the control unit 20 is placed in a status wherein the inquiry information is not selected. In response to the user selection of the cancel button 66, the control unit 20 may close the inquiry window 60 displayed on the display unit 26 and await any operation of the operation unit 24.

In the above example, the examination history information registered in the database 54 of the storage unit 22 includes the subject ID, the examination ID, the examination target, the examination date and time, and the subject name, for example, which are correlated with each other, regarding a completed examination. The examination history information may further include correlated information that identifies an ultrasonic probe that is used and information that identifies a preset that is used, for example. The "preset" as used herein refers to a function to determine a control parameter for each of the functions of the ultrasonic diagnostic apparatus 14. Actuation of the preset for a certain function, for example, causes each control parameter to be set to a default value or a reference value, and, for a certain control parameter, causes the display unit 26 to display an input format image for entering the certain control parameter. The user operates the operation unit 24 to set the control parameter in the input format image. The ultrasonic diagnostic apparatus 14 includes presets for various diagnoses including early obstetric, thyroid, abdominal, and chest diagnoses.

The control parameters include, for example, the depth of an observation range (diagnosis range), gain with respect to a received signal, time gain control, focus, and an echo enhancement level. The time gain control refers to a control parameter that adjusts a gain increasing state with elapse of the receiving time. The focus refers to a control parameter that indicates a degree of convergence of an ultrasonic beam. The echo enhancement level refers to a control parameter that indicates the degree of enhancement of the edge of a B-mode image.

FIG. 4 illustrates example examination history information 56 including, in addition to the subject ID, the examination ID, the examination target, and the examination date and time, the information that identifies the ultrasonic probe 16 and the information that identifies the preset, in a correlated manner. This type of examination history information 56 is registered in the database 54. Specifically, an identification reference numeral "CCVV55" or the information that identifies the ultrasonic probe 16 that is used is correlated with the examination ID "FUJI0033". This identification information may be a product name or a model number of the ultrasonic probe 16. Further, an identification reference numeral "10. Abdomen" (a preset for an abdominal diagnosis identified with number 10) is also correlated with the examination ID "FUJI0033" as a preset that is used. An identification reference numeral "LLNN99" or the information that identifies the ultrasonic probe 16 that is used is correlated with the examination ID "FUJI0022", and an identification reference numeral "3. Breast" (a preset for a chest diagnosis identified with number 3) is further correlated with the examination ID "FUJI0022" as a preset that is used.

In response to the user selection of one of the inquiry information items 68 or the examination history information items 56 displayed on the inquiry window 60 and selection of the resume examination button 62, the control unit 20 sets the status of the ultrasonic diagnostic apparatus 14 to resume the examination identified with the examination ID in the inquiry information 68. In this setting, the control unit 20 causes the display unit 26 to display the correlated identification reference numeral of the ultrasonic probe 16 in the inquiry information 68 and encourages the user to confirm whether or not an appropriate ultrasonic probe 16 is used. The control unit 20 further actuates the preset correlated with the examination ID in the inquiry information 68. This enables the user to easily set each control parameter suitable for the examination ID in the inquiry information.

The ultrasonic diagnostic apparatus according to the disclosure may have the below configurations, for example.

(Configuration 1)

The ultrasonic diagnostic apparatus includes a control unit configured to execute examination history acquiring processing to acquire, from a database, one or more examination history information items for an examination that has been performed within a time range between a current time and a time that is traced back from the current time, and inquiring processing to ask a user whether or not to resume an examination for each of the one or more examination history information items.

(Configuration 2)

In the ultrasonic diagnostic apparatus described in Configuration 1, when the user performs operation to resume the examination in response to the inquiring processing, the control unit is configured to generate integral examination history information including an examination performed prior to the resumption and the resumed examination, as a series of examinations, and to register the integral examination history information in the database.

(Configuration 3)

In the ultrasonic diagnostic apparatus described in Configuration 1 or 2, in response to the user operation to resume an examination, the control unit is configured to execute a preset for the examination to be performed.

(Configuration 4)

In the ultrasonic diagnostic apparatus described in any one of Configurations 1 to 3, the inquiring processing includes processing for displaying information that guides user operation.

The invention claimed is:

1. An ultrasonic diagnostic apparatus comprising a controller, the controller configured to execute:
   examination history acquiring processing to acquire, from a database, one or more examination history information items for an examination that has been performed within a predetermined time range between a current time and a time that is traced back from the current time, each of the one or more examination history information items including at least information of a subject ID and an examination target;
   inquiring processing to ask a user whether or not to resume the examination for the each of the one or more examination history information items; and
   when operation is performed to resume the examination in response to the inquiring processing, additional processing to generate integral examination history information including the examination that has been performed prior to resumption and the resumed examination, as a series of examinations, and to register the integral examination history information in the database.

2. The ultrasonic diagnostic apparatus according to claim 1, wherein
   the controller is further configured to execute a preset for the examination to be performed, in response to user operation to resume the examination.

3. The ultrasonic diagnostic apparatus according to claim 1, wherein
   the inquiring processing comprises processing for displaying information that guides user operation.

4. The ultrasonic diagnostic apparatus according to claim 1, wherein the each of the examination history information items further comprises information regarding examination date and time.

5. The ultrasonic diagnostic apparatus according to claim 1, wherein the each of the examination history information registered in the database includes other information for a completed examination, the other information including examination ID and examination date and time.

6. The ultrasonic diagnostic apparatus according to claim 1, further comprising an ultrasonic diagnosis unit configured to generate image data based on a received signal and to provide the image data to the controller.

7. The ultrasonic diagnostic apparatus according to claim 1, further comprising a communication unit configured for communication via a communication line with a management server, wherein the ultrasonic diagnostic apparatus via the communication unit communicates with the management server over the communication line.

8. An ultrasonic diagnostic system comprising
   the ultrasonic diagnostic apparatus according to claim 1; and
   a management server coupled via a communication line to the ultrasonic diagnostic apparatus, wherein the management server provides via the communication line to the ultrasonic diagnostic apparatus order information including a subject ID and an examination target for an unexecuted examination to be performed.

* * * * *